US012438725B2

(12) United States Patent
Chan

(10) Patent No.: US 12,438,725 B2
(45) Date of Patent: Oct. 7, 2025

(54) DELIVERING HASH VALUES

(71) Applicant: TAAL DIT GMBH, Zug (CH)

(72) Inventor: Jerry David Chan, Grand Cayman (KY)

(73) Assignee: TAAL DIT GMBH, Zug (CH)

( * ) Notice: Subject to any disclaimer, the term of this patent is extended or adjusted under 35 U.S.C. 154(b) by 188 days.

(21) Appl. No.: 18/266,248

(22) PCT Filed: Nov. 26, 2021

(86) PCT No.: PCT/EP2021/083229
§ 371 (c)(1),
(2) Date: Jun. 8, 2023

(87) PCT Pub. No.: WO2022/122423
PCT Pub. Date: Jun. 16, 2022

(65) Prior Publication Data
US 2024/0097911 A1 Mar. 21, 2024

(30) Foreign Application Priority Data
Dec. 10, 2020 (GB) ...................................... 2019451

(51) Int. Cl.
*H04L 9/32* (2006.01)
*H04L 9/00* (2022.01)
*H04L 9/08* (2006.01)

(52) U.S. Cl.
CPC ............ *H04L 9/3236* (2013.01); *H04L 9/085* (2013.01); *H04L 9/0863* (2013.01); *H04L 9/50* (2022.05)

(58) Field of Classification Search
CPC ..... H04L 9/3236; H04L 9/085; H04L 9/0863; H04L 9/50; H04L 9/0838; H04L 9/3297; H04L 63/0457; H04L 63/123; H04L 63/0428; H04L 67/1082; H04L 67/1093
See application file for complete search history.

(56) References Cited

U.S. PATENT DOCUMENTS

2019/0253524 A1    8/2019   Hoshizuki
2020/0403984 A1*  12/2020   Minehan ............... H04L 9/3247

FOREIGN PATENT DOCUMENTS

| JP | 2019139691 A | 8/2019 |
| WO | 02093826 A1 | 11/2002 |
| WO | 2020163247 A1 | 8/2020 |

OTHER PUBLICATIONS

Fujita K., "Mining Pool Selection Problem in the Presence of Block Withholding Attack," Block Withholding Attack, Feb. 27, 2020, vol. 119, No. 460, pp. 71-76, 9 pages.
Recabarren R., et al., "Hardening Stratum, the Bitcoin Pool Mining Protocol," Proceedings on Privacy Enhancing Technologies, vol. 3, 2017, XP080758131, pp. 54-71.

* cited by examiner

*Primary Examiner* — Matthew T Henning
(74) *Attorney, Agent, or Firm* — Messner Reeves LLP

(57) ABSTRACT

A computer-implemented method of delivering hash values from a hashing device to a hashing pool, wherein the method comprises: obtaining a candidate block header for a candidate block of a blockchain; performing a plurality of hashing operations on the candidate block header to generate a plurality of candidate proof-of-work (PoW) solutions; encrypting each of the candidate PoW solutions with an encryption key; and sending the encrypted candidate PoW solutions to a hashing pool, wherein the hashing pool configured to decrypt the encrypted candidate PoW solutions.

20 Claims, 5 Drawing Sheets

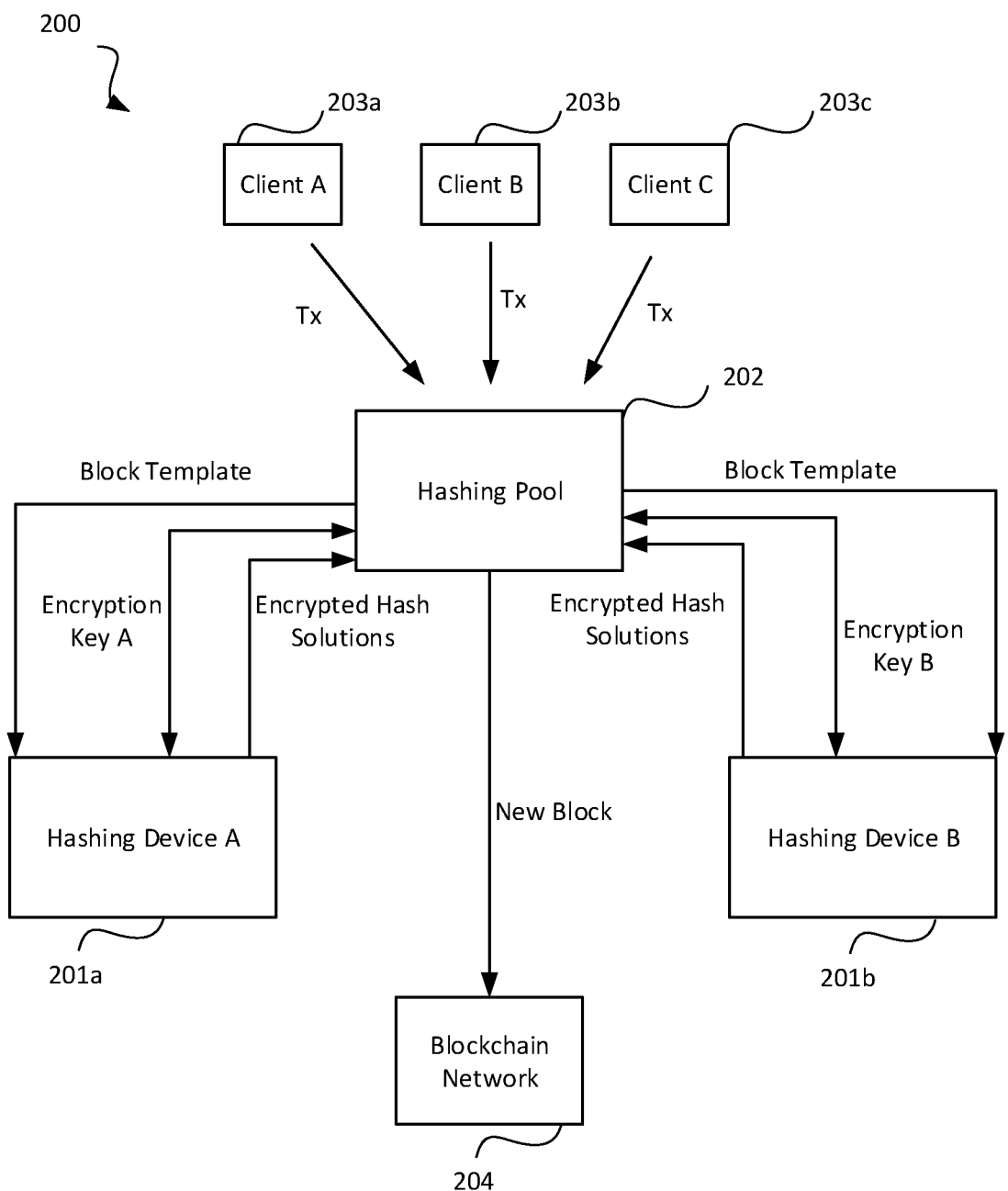

DELIVERING HASH VALUES

CROSS REFERENCE TO RELATED APPLICATIONS

This application is the U.S. National Stage of International Application No. PCT/EP2021/083229 filed on Nov. 26, 2021, which claims the benefit of United Kingdom Patent Application No. 2019451.0, filed on Dec. 10, 2020, the contents of which are incorporated herein by reference in their entireties.

TECHNICAL FIELD

The present disclosure relates to a method and apparatus for delivering hash values from a hashing device to a hashing pool.

BACKGROUND

A hashing pool (also referred to as a mining pool) is a node of a blockchain network that is responsible for collecting blockchain transactions, constructing a block template, then sending this block template out to hash producers (i.e. hashing devices) in order for those hash producers to find a hash solution. Hash producers repeatedly apply a hash function to the block template to produce candidate proof-of-work solutions. The candidate proof-of-work solutions are sent back to the hashing pool. If a candidate proof-of-work solution satisfies certain criteria it can be used as a valid proof-of-work solution for a new, valid block of the blockchain. Hashing pools typically compensate the hash producers for their work by paying them a share of any block rewards earned by the creation of a valid block.

SUMMARY

At present there is no way of enforcing a hash producer to transmit candidate proof-of-work (PoW) solutions to the hashing pool. That is, a hash producer may intentionally "hold-back" candidate PoW solutions. This is particularly problematic if the hash producer has found a valid PoW solution that would allow the hashing pool to publish a new block and claim the associated block reward. Worse still, at present there is no way of a hashing pool enforcing a hash producer to send candidate PoW solutions to that particular hashing pool, as opposed to some other hashing pool.

It would therefore be desirable to solve one or both of these problems. That is, it would be desirable to ensure that the candidate PoW solutions produced by a hash producer can only be used by one particular hashing pool. It would also be desirable to incentivize the hash producer not to hold back candidate PoW solutions.

According to one aspect disclosed herein, there is provided a computer-implemented method of delivering hash values from a hashing device to a hashing pool, wherein the method comprises: obtaining a candidate block header for a candidate block of a blockchain; performing a plurality of hashing operations on the candidate block header to generate a plurality of candidate proof-of-work (PoW) solutions; encrypting each of the candidate PoW solutions with an encryption key; and sending the encrypted candidate PoW solutions to a hashing pool, wherein the hashing pool configured to decrypt the encrypted candidate PoW solutions.

According to another aspect disclosed herein, there is provided a hashing device comprising: an input interface configured to obtain a candidate block header for a candidate block of a blockchain; a hashing component configured to apply a hash function to at least the candidate block header one or more times, wherein each application of the hash function to at least the candidate block header generates a respective candidate PoW solution; an encrypting component configured to encrypt each of the candidate PoW solutions; and an output interface configured to output the candidate PoW solutions to a hashing pool.

The hashing device obtains a candidate block header and performs hashing operations on it in order to generate candidate PoW solutions. Each different instance of the hashing operation involves applying a hash function (e.g. a double-hash) to the candidate block header and a different value (sometimes called a nonce) in order to generate a different candidate PoW solution. Each candidate PoW solution is encrypted and sent to the hashing pool. Only the hashing pool can decrypt the encrypted solutions. Therefore only the particular hashing pool, and no other hashing pool, can utilise the candidate PoW solutions. If the candidate PoW solution is a valid (i.e. winning) PoW solution for a candidate block, the valid PoW solution can be used to publish a new block on the blockchain. The newly published block, and its winning PoW solution, will be verified by other entities on the blockchain network.

According to another aspect disclosed herein, there is provided a computer-implemented method of obtaining hash values from a hashing device, wherein the method comprises: receiving a plurality of candidate PoW solutions from a hashing device; counting the number of candidate PoW solutions received from the hashing device over a predetermined period of time; and determining whether a contract has been fulfilled based on whether the number of candidate PoW solutions meets an expected number of candidate PoW solutions.

The hashing pool receives a plurality of candidate PoW solutions from the hashing device. The hashing pool can then determine whether a contract between the hashing pool and the hashing device has been met based on whether an expected number of candidate PoW solutions have been received over the course of a predetermined time period, e.g. minutes, hours, days, etc. This incentivizes the hashing device to send the candidate PoW solutions to the hashing pool in order to fulfil the contract and, in some examples, be rewarded for the candidate PoW solutions. In some examples, the candidate PoW solutions are encrypted prior to sending to the hashing pool.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 2 is a schematic block diagram of a system for delivering hash values from hashing devices to a hashing pool.

DETAILED DESCRIPTION OF EMBODIMENTS

Figure 1A:
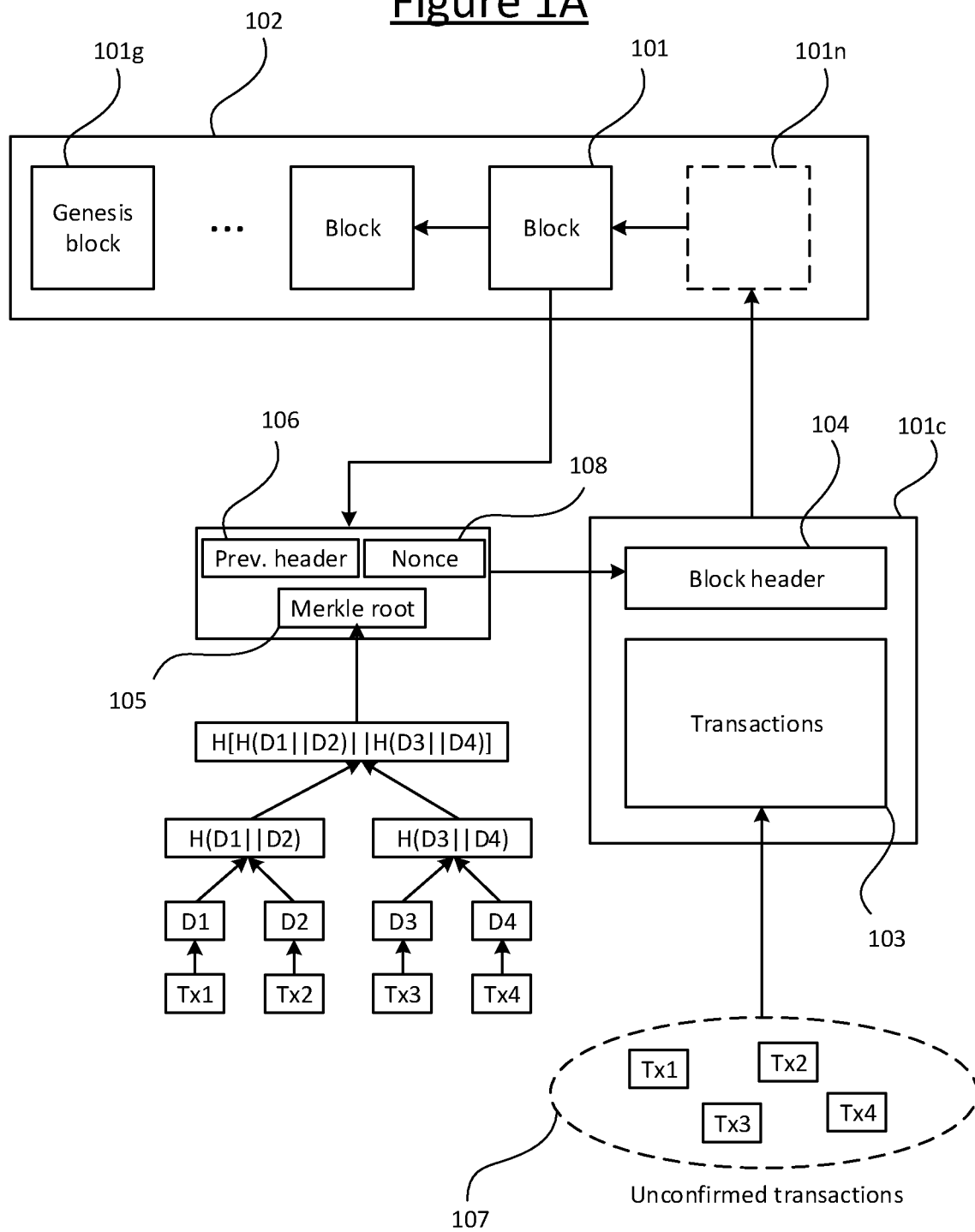
FIG. 1A schematically illustrates an example method for mining a new block to a blockchain, FIG. 1B schematically illustrates a pair of blockchain transactions.

FIG. 1A schematically illustrates an example method for mining a new block 101*n* on a blockchain 102. A blockchain 102 is a form of distributed database (or ledger) that acts as a record of all valid transactions 103 that have ever been transmitted to the blockchain network.

Figure 1B:
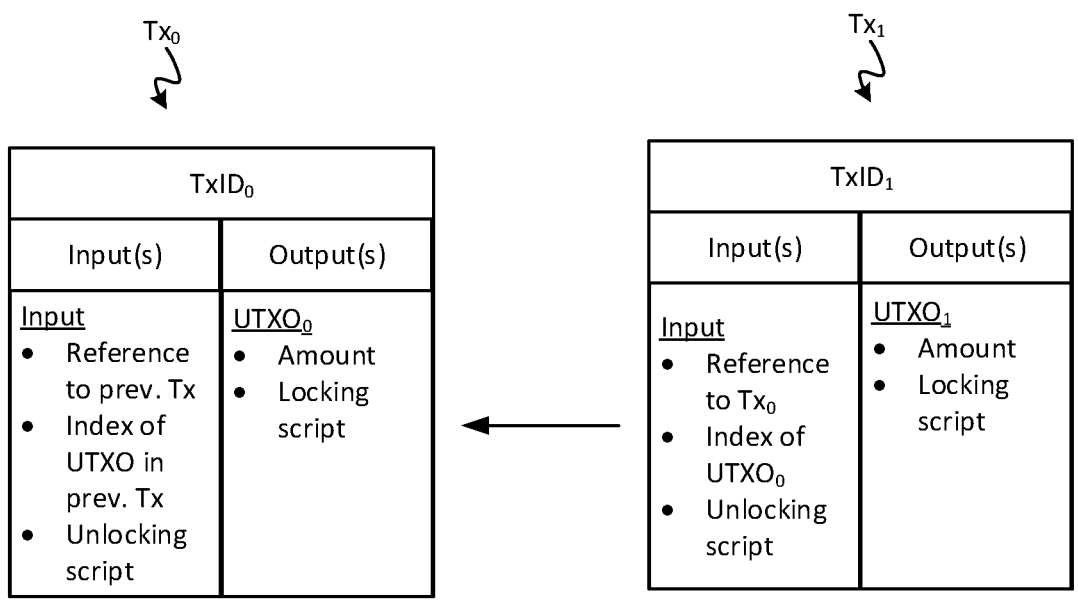

Valid transactions 103 that are broadcast on the blockchain network are recorded on the blockchain 102 by miners (also referred to as mining nodes) in blocks. A blockchain transaction 103 is used to transfer custody of an amount of a digital token. A pair of transactions 103 are shown in FIG. 1B. As shown, each transaction 103 includes, amongst other things, at least one input and at least one output. An input is a reference to an unspent transaction output (UTXO) from a previous transaction. For example, in FIG. 1B, $Tx_1$ contains an input that references a UTXO of $Tx_0$. A transaction 103 uses unspent transaction outputs (UTXOs) as inputs and distributes their value to new outputs. An output typically includes a locking condition that locks the value of that output, requiring certain data (e.g. a set of keys or other information) to be provided in an input of a new transaction 103 in order to be unlocked. Outputs can also be used to inscribe data onto the ledger. An input of a transaction 103 usually includes a digital signature that signs over a transaction 103. A chain of transactions 103 therefore includes a chain of digital signatures that maps out the entire history of valid exchanges of the digital tokens all the way back to their creation.

Returning now to FIG. 1A, the blockchain 102 begins with a "genesis block" 101g, which is the first block 101 ever created. Each block on the blockchain 102 references a previous block, all the way back to the genesis block. That is, the $n^{th}$ block 101 reference the $n-1^{th}$ block 101, the $n-1^{th}$ block reference the $n-2^{th}$ block 101, and so on, back to the genesis block 101g.

A block 101 contains an ordered list of blockchain transactions 103 and a block header 104. The block header 104 includes a Merkle root 105 that is generated by hashing the ordered list of blockchain transactions 103 into a Merkle tree, a timestamp, a reference 106 to the previous block 101 that the present block 101 builds upon and the means to validate the "proof-of-work" needed for other miners to accept the block 101 as valid. That validation means is an answer to a hash puzzle which is unique to each block 101. The blockchain protocol run by nodes of the blockchain network uses a hashing algorithm that requires miners to pre-build their candidate block 101c before trying to solve the puzzle. New blocks 101n cannot be submitted to the network without the correct answer—the process of "mining" is essentially the process of competing to be the next to find the answer that "solves" the current block 101. The hash puzzle in each block 101 is difficult to solve, but once a valid solution is found, it is very easy for the rest of the network to confirm that the solution is correct. There are multiple valid solutions for any given block 101—only one of the solutions needs to be found for the block 101 to be solved.

The following briefly describes the process of attempting to mine a new block 101n to the blockchain 102. When a blockchain transaction 103 is transmitted to a mining node, it is first validated according to the consensus rules of the blockchain network. If the transaction 103 is valid it is added to a pool 107 of unconfirmed transactions 103. The pool 107 is sometimes referred to as a "mempool". The mempool 107 acts as a temporary store of transactions 103 to be mined into the next block 101n. Each mining node will have its own mempool 107, and any given transaction 103 may be included in more than one mempool 107 if it has been broadcasted to more than one mining node.

A hash function is a function that converts a string of data of arbitrary length into a fixed length value, called the hash value or a hash digest. Hashing is a one-way function, meaning it is infeasible to determine what the input data is by looking at the hash value produced from it. On the other hand, it is trivial to run the same input data through the same hash function and reproduce the same hash. Some blockchain protocols use the SHA-256 hashing algorithm, and some protocols use the SHA-256 hashing algorithm twice, i.e. the candidate block header is passed through the same hashing algorithm twice.

A Merkle tree is a data structure in the form of a tree of hash values. In the context of the blockchain 102, a transaction 103 is hashed to form a leaf node of the tree. As shown in FIG. 1A, transaction Tx1 is hashed to form leaf node D1, transaction Tx2 is hashed to form leaf node D2, and so on. Pairs of leaf nodes are concatenated and then hashed to form a node in a higher layer of the tree. For example, leaf nodes D1 and D2 are concatenated and hashed to give a node in a higher layer. Pairs of nodes in that layer are then concatenated and hashed to form a node in a yet higher layer of the tree. The process is repeated until only a single node is left, referred to as the root node, or the Merkle root 105.

A miner takes the transactions 103 it intends to include in the next block 101 and hashes them into a Merkle tree structure and includes the resulting Merkle root 105 within a candidate block header 104. The miner then hashes this candidate block header 104, attempting to find a valid proof-of-work.

A valid proof-of-work if found by hashing the candidate block header 104 (in combination with other data, as discussed below) until the result is less than another value, called the target value. The target value is automatically adjusted by the blockchain protocol so that, on average, it takes the blockchain network ten minutes to find a valid proof-of-work.

In order to change the hash value, a mining node must add additional information to the candidate block header 104. Mining nodes typically use two "nonce fields" to alter the value to be hashed, and thus alter the resulting hash value. A first nonce field 108 is included in the block header itself, and the second nonce field is included in a "coinbase transaction". A coinbase transaction is a transaction created and included in the candidate block by the mining node. Each field includes a counter parameter that can be incremented. The hash function cycles through all values of the first nonce 108 field then increments (or otherwise changes) the second nonce field, before going through all permutations of the first nonce field 108 again. Incrementing the second nonce field involves recomputing the Merkle root 105 as it modifies the hash of the coinbase transaction, which is included in the Merkle tree.

When a mining node finds a valid proof-of-work hash for a block 101 (i.e. a candidate block header 104 that hashes to a value less than the target value), it broadcasts the new block 101n to the rest of the blockchain network. The other nodes on the network accept this new block 101n only if all the transactions 103 in it are valid and have not yet been included in a block. Every block 101 is timestamped and references the hash of the block 101 preceding it, thus resulting in a chain of blocks (i.e. the blockchain 102).

The above has been described in terms of an "output-based" transaction model. An alternative type of transaction model is an "account-based" model. In this model, each transaction 103 does not define the amount of the digital token to be transferred by referring back to an unspent transaction output, but instead rather by reference to an absolute account balance. The current state of all accounts is stored by the miners separate to the blockchain 102 and is updated constantly. In such a system, transactions 103 are ordered using a running transaction tally of the account (also called the "position"). This value is signed by the sender as part of their cryptographic signature and is hashed as part of the transaction reference calculation.

FIG. 2 schematically illustrates an example system 200 for delivering hash values from a set of hashing devices 201a, 201b to a hashing pool 202. In this example system 200 there are two hashing devices 201a, 201b but the system 200 may in general comprise any number of hashing devices 201. The system also comprises a set of blockchain client applications 203a, 203b, 203c. Whilst only three client applications 203a, 203b, 203c are shown, the system may comprise any number of client applications 203. In general, the client applications 203 are configured to submit blockchain transactions to the hashing pool 202. The hashing pool is configured to construct a block template 101c and send the block template 101c (or at least the candidate block header 104 of the block template 101c) to the hashing devices 201a, 201b. Each hashing device 201 is configured to generate candidate PoW solutions based on the candidate block header 104. The system further comprises a blockchain network 204 comprising a plurality of blockchain nodes.

According to some embodiments of the present invention, a hashing device 201a is configured to obtain a candidate block header 104. E.g. the candidate block header may be sent to the hashing device 201a by the hashing pool separately or as part of a block template 101c. That is, the hashing device need not have access to the transactions of the block template 101c. The hashing device is then configured to generate a plurality of hash values based on the block header 104. These hash values are known as candidate PoW solutions. Note that the candidate PoW solutions need not necessarily be valid block solutions. That is, some or all of the candidate PoW solutions may not solve the PoW puzzle required to publish a new, valid block on the blockchain. In fact, due to the probabilistic nature of hashing, the vast majority of the candidate PoW solutions produced by a given hashing device 201 will not be valid block solutions. As explained above with reference to FIG. 1, the nonce value 108 of the candidate block header 104 is changed with each application of the hash function (i.e. with each instance of the hashing operation) in order to produce a different hash value.

In some embodiments, the hashing device 201a encrypts each of the candidate PoW solutions. That is, each candidate PoW solution is separately encrypted. In general any encryption technique may be used. Some example encryption techniques are given below.

In these embodiments, the hashing device 201a sends the encrypted candidate PoW solutions to the hashing pool 202. The hashing pool 202 is configured to decrypt the encrypted candidate PoW solutions in order to reveal the candidate PoW solutions. If one of the candidate PoW solutions is a valid block solution, the hashing pool may publish a block to the blockchain which contains the valid block solution, the candidate block header 104, and the transactions on which the candidate block header 104 is based.

As shown in FIG. 2, the hashing pool 202 may send the candidate block header 104 (e.g. as part of the block template 101c) to more than one hashing device 201. This improves the chances of a valid block solution being found. Each hashing device 201 performs similar operations of produced candidate PoW solutions, encrypting those candidate PoW solutions and sending the encrypted versions to the hashing pool 202.

The hashing device 201a uses an encryption key to encrypt the candidate PoW solutions. The encryption key may be a symmetric key, an asymmetric key, or a different type of encryption key.

For instance, the hashing device 201a may encrypt the candidate PoW solutions using a one-time pad (OTP). A one-time pad is a pre-shared key that is the same size as, or longer than, the message to be encrypted. In this case the message is a candidate PoW solution. Each bit of the candidate PoW solution is encrypted by combining it with a corresponding bit of the one time pad. Here, a bit of the OTP corresponds to a bit of the candidate PoW solution if those bits are at the same position, e.g. the first bit of the candidate PoW solution is combined with the first bit of the OTP, the second bit of the candidate PoW solution is combined with the second bit of the OTP, and so on. The bits may be combined using modular addition or a different type of modular arithmetic. The encrypted message (i.e. the encrypted candidate PoW solution) can only be decrypted with knowledge of the OTP. The hashing pool 202 has knowledge of the OTP and can therefore decrypt the encrypted candidate PoW solutions. For instance, upon receiving an encrypted PoW solution, the hashing pool 202 uses the OTP to "de-combine" (i.e. filter out) the OTP from the encrypted PoW solution. In other words, the reverse operation may be used to reveal the underlying bit of the candidate PoW solution. For instance, if the bits of the candidate PoW solution and OTP are combined using modular addition, then modular subtraction may be used to reveal the bit of the candidate PoW solution. Encryption using modular addition can also be used with encryption keys other than a OTP.

In some examples, the OTP may be used to encrypt the candidate PoW shares using XOR encryption, i.e. using the exclusive disjunction (XOR) operator. As will be familiar to the skilled person, the XOR operator outputs a 0 whenever the inputs do match, and a 1 whenever the inputs do not match. Note that XOR encryption may be used with encryption keys other than a OTP.

In some examples, the hashing pool may send the encryption key (e.g. OTP) to the hashing device 201a. The hashing pool may send different encryption keys to different hashing devices 201b. Conversely, the hashing device may send the encryption key to the hashing pool 202.

One option for sharing the encryption key is to establish a shared secret between the hashing device 201a and the hashing pool 202. A shared secret is data known only to (or derivable only by) the hashing device 201a and the hashing pool 202. The shared secret is used to encrypt the encryption key. That is, the encryption key itself is encrypted, thus improving security of the encryption key when shared between the hashing device 201a and hashing pool 202.

In general the shared secret may be any secret data. As a particular example, the shared secret may be derived based on a private key of the hashing device 201a (e.g. installed on the device) and a public key of the hashing pool 202. Due to the properties of private-public key-pairs, the same shared secret may also be derived based on a private key of the hashing pool 202 corresponding to the public key used by the hashing device 201a, and the public key of the hashing device 201a corresponding to the private key used by the hashing device 201a. The public keys may be publicly accessible, or shared in some other way between the hashing pool 202 and hashing device 201a.

In some examples, the public-private key pairs used to generate the shared secret may themselves be based on a common value (not necessarily secret). This common value is normally referred to as a deterministic key, and may be the result of applying a hash function to a message. That is, the hashing device 201a may generate a second private key based on a first private key and the deterministic key. The hashing device may generate a second public key of the hashing pool 202 based on a first public key of the hashing pool 202 and a public key corresponding to the deterministic key. The shared secret is then generated based on the second private key of the hashing device 201a and the second public key of the hashing pool 202. The hashing pool 202 may perform equivalent operations to generate the same shared secret. See WO2017/145016 as a particular example of establishing a shared secret.

Firmware installed on the hashing device 201a may have a fingerprint, e.g. a public key fingerprint. The public key fingerprint may be just a public key itself, or e.g. based on the public key. In some examples, the private key of the hashing device 201a may be based on the fingerprint, e.g. a hash or checksum of the fingerprint.

Rather than only ever using a single encryption key, the encryption key may be updated. For instance, the encryption key may be updated periodically, e.g. after a predetermined amount of time since the last update. E.g. every 1 hour, 1 day, etc. In some examples, the encryption key may be updated in response to receiving a new candidate block header 104. That is, each time the hashing device 201a receives a new candidate block header 104 on which the candidate PoW solutions are based, a new encryption key may be used to encrypt those solutions. In some examples, the encryption key may be based on the candidate block header 104. As another example, the encryption key may be updated in response to a reset or reboot of the hashing device 201a, e.g. in response to the hashing device 201a temporality going offline.

The hashing device 201a may be configured to encrypt every single candidate PoW solution that is produced. Therefore only encrypted solutions can be output from the hashing device 201a, e.g. to the hashing pool 202. This prevents other hashing pools from using the solutions.

The hashing device may, in some examples, only encrypt candidate PoW solutions that satisfy a predetermined difficulty condition, i.e. solutions that comprise a predetermined number of leading zeros (e.g. 10 zeros). In these examples, only these encrypted solutions are sent to the hashing pool 202. This reduces the amount of data sent from the hashing device 201a to the hashing pool 202.

Although the above has been described primarily in terms of the hashing device 201a sending the encrypted PoW solutions to the hashing pool 202, the encrypted PoW solutions may be sent indirectly to the hashing pool 202, e.g. via an intermediary device that is configured to forward the encrypted PoW solutions to the hashing pool 202.

Figure 3:
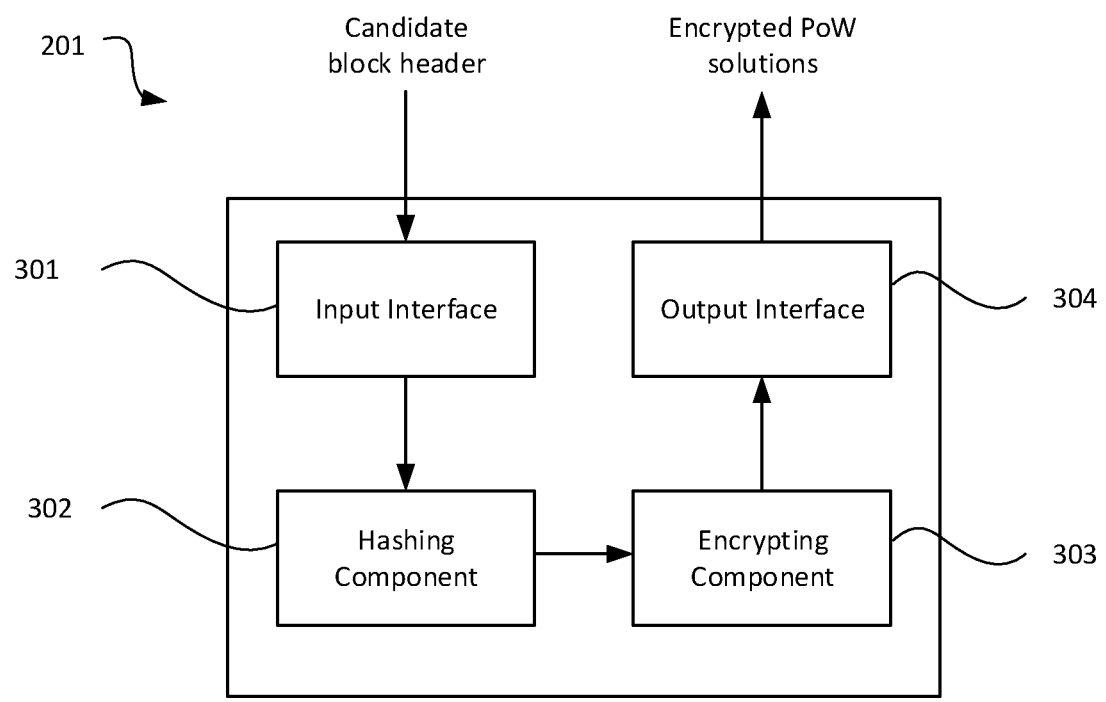
FIG. 3 is a schematic block diagram of a hashing device, and FIG. 4 schematically illustrates an example method according to some embodiments of the present invention.

FIG. 3 schematically illustrates a hashing device 201 according to embodiments of the present invention. The hashing device 201 comprises an input interface 301, a hashing component 302, an encrypting component 303, and an output interface 304.

The input interface 201 is configured to obtain a candidate block header. Candidate block headers 104 have been discussed with reference to FIG. 1. A candidate block header 104 comprises a representation of a set of blockchain transactions, e.g. a Merkle root 105. The candidate block header 104 may also comprise a reference 106 to a previous block, a timestamp, and/or a nonce value 108. In some examples, the input interface 301 may obtain a set of transactions 103. In those examples, the input interface 201 may be configured to obtain the candidate block header 104 by generating the candidate block header 104 based on the set of transactions 103. That is, the input interface 301 may comprise a component for constructing a Merkle tree to generate a Merkle root 105 of the set of transactions 103. The input interface 301 may be configured to obtain any other information required to construct the candidate block header 104. For instance, the input interface 301 may be configured to receive a reference to a previous block 101 of the blockchain 102, i.e. the block header of the previous block 101. The input interface 301 may be configured to obtain a candidate block template 101c comprising the candidate block header 104 and the set of transactions 103. Note that any instance of "obtaining" a data item (e.g. the candidate block header 104 or candidate block template 101c) may be taken to mean receiving that data item, unless the context requires otherwise.

In some examples, the input interface 301 may be connected to mining software. For instance, the mining software may be configured to supply the hashing device 201, e.g. via the input interface 301, with the set of transactions 103 and/or the candidate block header 104. The mining software may be configured to supply the hashing device 201 with additional information, e.g. the reference 106 to the previous block 101 of the blockchain 102. The mining software may comprise, or otherwise have access to, a pool 107 of unconfirmed transactions from which the set of transactions 103 are supplied to the hashing device 201. The mining software may be operated by the hashing pool 202 in some examples and thus separate to the hashing device 201.

The hashing component 302 is configured to apply a hash function to at least the candidate block header 104. In some examples, the hashing component 302 is configured to apply the hash function to the candidate block template 101c, which comprises the candidate block header 104. The hashing component 302 is configured to generate one or more hash digests (or hash values) based on the input received from the input interface 301, e.g. the candidate block header 104. The hashing component 302 may generate a plurality of hash digests. For instance, the hashing component 302 may comprise a single hash function that hashes the candidate block 104 header multiple times. Additionally or alternatively, the hashing component 302 may comprise multiple hash functions, each configured to hash the candidate block header 104 one or more times. Each hash function may apply the same hash function (e.g. SHA-256). Alternatively, one or more hash functions may apply a different hash function (e.g. SHA-512). Applying a hash function may comprise applying a sequence of hash functions (e.g. applying SHA-256 twice) to generate a single hash digest. Note that reference to hashing the candidate block header 104 should be taken to mean hashing at least the candidate block header 104, unless the context requires otherwise. Note also that the hash digests are synonymous with candidate PoW solutions.

The hashing component 302 is configured to supply the hash digests to the encrypting component 303. The encrypting component 303 is configured to encrypt the hash digests received from the hashing component 302. In general any encryption technique may be used. In some examples, the encrypting component 303 may be configured to receive the encryption key from input interface 301, e.g. the hashing pool 202 may transmit the encryption key to the hashing device 201. In some examples, the encrypting component 303 may be configured to generate the encryption key, e.g. based on data supplied from the input interface 301. The encrypting component 303 is configured to supply the encrypted PoW solutions to the output interface 304.

The hashing device 201, or more specifically the output interface 304, may have a local area network (LAN) connection for LAN access, where encrypted PoW solutions are output to be consumed locally by the hashing pool 202 in the local area network where the hashing device 201 is located. Additionally or alternatively, the output interface 304 may have a wide area network (WAN) connection for WAN access, where the encrypted PoW solutions are transported over the WAN (e.g. internet) to the hashing pool 202 from the network where the hashing device 201 is located.

One or more of the components of the hashing device 201 may be implemented in software. That is, the hashing device 201 may comprise processing apparatus comprising one or more processors, e.g. one or more central processing units (CPUs), accelerator processors (GPUs), application specific processors and/or field programmable gate arrays (FPGAs). The apparatus may also comprise memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive. The hashing device 201 may comprises at least one user terminal, e.g. a desktop or laptop computer, a tablet, a smartphone, or a wearable device such as a smartwatch. Alternatively or additionally, the hashing device 201 may also comprise one or more other networked resources, such as cloud computing resources accessed via the user terminal (the cloud computing resources comprising resources of one or more physical server devices implemented at one or more sites).

Additionally or alternatively, one or more of the components of the hashing device 201 may take the form of dedicated hardware. For instance, the hashing component 302 may comprise one or more hashing devices that are specifically configured to implement a hashing algorithm. For example, the hashing component 302 may comprise one or more application-specific integrated circuit (ASIC) mining devices, e.g. configured to implement a SHA-256 hashing algorithm. Note that in general any hashing algorithm may be used to produce the hash digests.

In some examples, the hashing device 201 may be operated by a hashing farm. The hashing farm may comprise multiple hashing devices. The hashing device 201 may be connected to the hashing farm, e.g. via the input interface 301. In some examples, the candidate block header 104 may be sent to the hashing farm (e.g. from the hashing pool 202) which then supplies it to the hashing device 201. Similarly, the hashing device 201 may supply the encrypted PoW solutions to the hashing farm, which then supplies them to the hashing pool 202.

As discussed above, the hashing pool 202 is configured to receive the encrypted PoW solutions from the hashing device 201a and decrypt them, thus resulting in the candidate PoW solutions. The hashing pool 202 uses a decryption key corresponding to the encryption key used by the hashing device 201a, which in some examples may be the same as the encryption key. If a candidate PoW solution satisfies a predetermined difficult setting set by the blockchain network, the hashing pool 202 may use that PoW solution as a block solution. A block comprising the block solution may then be submitted to the blockchain network 204.

According to some embodiments, the hashing pool 202 may count the number of candidate PoW solutions received from the hashing device 201a in order to check whether a contact has been fulfilled. The contract may stipulate the number of PoW solutions that should be sent to the hashing pool 202 by the hashing device 201a. The contract may stipulate that a certain number of candidate PoW solutions must be received over a particular time period, e.g. one hour, one day, one week, etc. In these embodiments, the hashing pool 202 may only reward the hashing device 201a (or the operator of the hashing device 201a, e.g. the hash farm) if the contract has been fulfilled. Moreover, a reward may only be provided in a valid block solution is provided.

Note that in the most general embodiment, the hashing pool 202 need not have to count encrypted PoW solutions to determine whether the contract has been fulfilled. However, in at least some examples only encrypted PoW solutions are counted.

The hashing pool 202 may comprise processing apparatus comprising one or more processors, e.g. one or more central processing units (CPUs), accelerator processors (GPUs), application specific processors and/or field programmable gate arrays (FPGAs). The hashing pool 202 may also comprise memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive. The hashing pool 202 may comprise at least one user terminal, e.g. a desktop or laptop computer, a tablet, a smartphone, or a wearable device such as a smartwatch. Alternatively or additionally, the hashing pool 202 may also comprise one or more other networked resources, such as cloud computing resources accessed via the user terminal (the cloud computing resources comprising resources of one or more physical server devices implemented at one or more sites).

Figure 4:
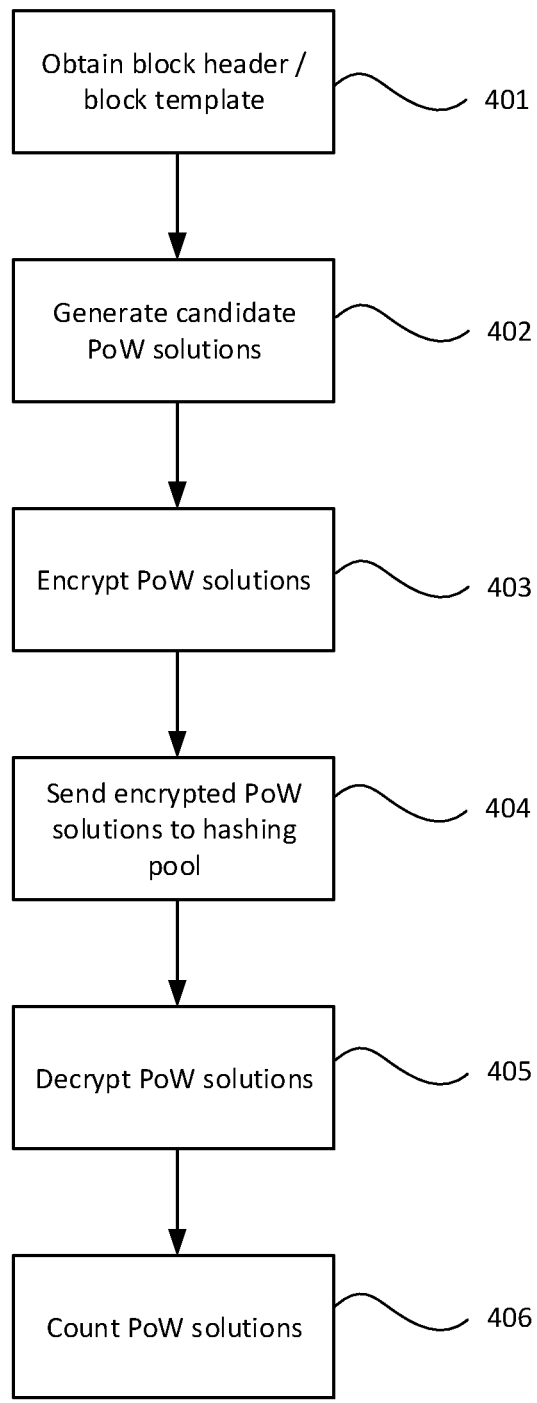

FIG. 4 illustrates an example method 400. It will be appreciated that some of the steps of this method 400 are optional and that the method 400 may comprise additional steps. It will also be appreciated that some steps are performed by the hashing device 201a and some are performed by the hashing pool 202. At step 401, the hashing device 201a obtains a candidate block header 104, e.g. as part of a block template 101c. At step 402 the hashing device 201a generates a plurality of different candidate PoW solutions based on the candidate block header 104. Those candidate PoW solutions are then encrypted at step 403 before being sent to the hashing pool 202 at step 404. At step 405 the hashing pool 202 decrypts the encrypted PoW solutions and counts them at step 406 to determine whether a contract for a set number and/or rate of hash has been fulfilled.

Example Use Case

Presently, there exists over the counter (OTC) hash futures. This market is very thin and not widely traded, due in most part because of a lack of a method to sufficiently hedge the counterpart risk involved. The hash rate market is relatively new coming as part of the advent of cryptocurrency 'mining rigs' which are purpose-built ASICs which perform optimized hashing algorithms in order to support Proof-of-Work digital asset blockchains. As such, methods by which a properly functioning derivatives market based on this 'commodity' is not entirely clear. Therefore, participants in the OTC hash power futures that are currently available are mostly regulated to speculators and hedge funds that trade these futures as a proxy for holding the underlying asset. Additionally, as hash rate is not a physical commodity, it is difficult to create a physical settlement on any such futures contracts. However, there is a direct relationship between hash rate and the digital assets that can be produced from this hash rate, therefore a relationship between the spot price of the asset to these hash rate futures. That is, the more hash shares received at a pool the higher the chance a PoW block solution is found, and thus more digital assets produced. However, there is not currently any method by which this risk basis can be hedged.

It would therefore be desirable to enable hash power futures to be accurately settled and accounted for, and settled by way of using a mining pool much the same way as power market futures use power pools (or power markets, e.g. PJM, Northwest, ISO-NE, etc.) to act as delivery locations. By using the existing power markets as an analog, many of the market features and issues that surround the smooth operation of a hash rate futures and spot market can be solved, thus enabling a liquid market to develop, and thus fair price discovery for the digital asset that is produced from the hash production.

Additionally, it would be desirable for a device and process by which the hash rate that is delivered from a hashing rig can be guaranteed to be generated and sent only to the settlement pool, and no other pool. This solves the common problem of 'holding out' the hash solution that actually solves a block in order to cheat the pool.

PPLNS (Pay Per Last N Shares) is a payout algorithm used by hashing pool. As this is a method with pays only what it earns, there is no risk to the pool operator in having to pay out to the hash contributors without actually having block rewards to back the payouts. PPLNS sufficiently discourages hashers from withholding winning shares from a pool that they share the profits from, but does not sufficiently protect against non-delivery of winning hash shares to the pool for the purposes of hash rate futures physical settlement. Therefore, something more is required in which the hash rate can be 'guaranteed' to be received (or else would constitute non-delivery).

Definitions

Hashers (i.e. miners)—owners of hashing rigs (i.e. hashing devices)—e.g. ASIC mining units producing valid SHA256 (or other) hash solutions to solve blocks on a blockchain.

Hashing farm operators—operators which manage and operate fleets of hashing rigs at one or more locations, and charge for their services.

Hashing Pool (i.e. mining pool)—the operator of the blockchain network node responsible for assembling and creating blocks. This is analogous to a settlement and clearing house for hash rate futures.

Market participants—buyers and sellers of hash rate futures on a registered exchange. There are three types: hedgers, speculators and consumers.

Hash Rate Hedgers—normally hashers, or operators of hashing farms, who knowing the future ramp up schedule of their fleet, would like to sell their hash rate production in the future, in order to lock in their price for their hash rate, both to hedge against the movement in the underlying digital asset prices, and also to hedge against the volatility in the total network hash distribution. If the hashing pool is using FPPS (full pay per share) or PPS (pay per share) then the hash rate is paid to the hashing pool. However if the hashing pool is using PPLNS (pay per last n shares), then the hashers are more akin to participating in a pooled lottery system. They pool their lottery tickets, and if the pool wins, then the jackpot is split prorate to the pool hash contributors according to their percentage of hash contributed to the winning block (n shares leading up to the block).

Hash rate hedgers sell a fixed number of hashes per unit time at some point in the future. They sell e.g. 100 TH/s for 1 d, 3 d, 1 w, 1 m etc. Note TH stands for tera hashes. The buyer of the contract therefore requires metering and a guarantee that the hash rate delivered is actually 'good'. Events like power outages or hashing rig failures happen and therefore counting up all the hashes delivered and averaging them out and making sure that the numbers work out is a service that is needed by the pool which wishes to act as a settlement and clearing house.

Hash rate speculators—hedge funds that may want a risk exposure to the digital asset without actually owning the asset. Those who may want a risk exposure to changes in total network hash distribution and production. ASIC manufacturers who may want to enhance their profit margins by shorting hash rate futures in line with their hashing rig sales.

Hash rate consumers—natural buyers of hash rate, transaction processors required hash rate in order to commit the transactions on a blockchain into blocks. How much hash rate is required is directly proportional to their required service level agreements (SLAs) on their transaction processing agreements.

Hashing pool—an entity which is responsible for collecting transactions on the blockchain, and constructing a block template, then sending this block template out to hash producers in order find a hash solution for by using proof of work hashing. Hashing pools compensate the hash producers for their work by paying them a share of any block rewards earned by the creation of a valid block. The hashing pool may be a group of mining nodes who combine their computing power to perform the described actions of the pool.

Settlement and Clearing houses are used in order to settle or net out a day's worth of trading on exchanges.

Every hash contract has a delivery pool. Each contract must specify the hashing pool which the hash power will be delivered to. That hashing pool is responsible for the metering of the hash power, and delivering the produced coins (e.g. bitcoins) to the exchange clients (buyers of the contracts). When the contract comes due, if it is physically settling, then the hashing pool will expect hash arriving at the pool in order to make good on the contract. The pool may provide delivery instructions to the party that needs to deliver the hashpower. These instructions may include a fingerprint unique to the deliverer and the delivery location, and a unique factor (e.g. timestamp concatenated with a contract ID) and hashed to produce a one-time pre-shared key. This may then be used as a one-time pad in order to encrypt the hash shares (e.g. using either XOR or modular addition) sent to the delivery pool to be counted towards the delivery contract.

In addition, if the participant is optionally running a delivery compliant firmware, the hash power can be guaranteed so that the delivery pool can be assured that no shares are lost between the hashing rigs, and the delivery pool. As this hash power is now guaranteed, then less can be charged on the settlement and clearing fees, and on the margins required to be kept on account. A check of the fingerprint of the firmware installed on the hashing rig can be performed to check that it has not been tampered. For instance, the firmware's checksum (e.g. sha256 hash) may itself be used as part of its private key (for the secret sharing). A hardware call may be used to check the binary dump of the firmware. It is the firmware that encrypts the shares that leave the hashing rig. If any hashes were to sent elsewhere, they would not be decryptable. This method guarantees that a given hashing rig cannot be hi-jacked to solve alternative blocks that are not being worked on by the delivery pool.

With the ability to 'measure and meter' the hash power coming into the pool, a hashing pool effectively becomes analogous to a 'delivery location' in the power derivatives business. A delivery location is the 'point of metering' of kWh to be delivered when a power future is delivered. A power future is a contract to deliver a certain amount of kWh at a certain time in the future for a certain price. Depending on what the spot price of power at the time of delivery the holder of such contract, can demand cash settlement, (on a per hour basis) or to actually take delivery of the power. Currently the hash power market only has cash settlement, and is not able for actual delivery of hash power. This makes the market very speculative in nature and not terribly useful as a hedging instrument for miners who own the hash production capacity. With this patent and method of using a pool as the metering device for hash power, physical hash power can be received and measured, therefore allowing hash futures the be physically settled. This has the benefit for the utility and liquidity of this market.

The following provides an example of metering hash. If a buyer has bought 100 TH/s for 1 day, then one could simply count 86400*1 trillion hashes and be done. But that would mean every hash is sent over the network from the hashing rig to the hashing pool. But this isn't preferable because that would be too much to send over the internet. So what happens is that a *difficulty hash target* is set, i.e., only send hash values if they have (through pure random chance) say, 4 leading 0's in the front. Statistically the chance of any given hash having 4 leading zeros is exactly $\frac{1}{16}$^4~=1.5 in 10000 chance. So if the hashing device is set up in this way, then it will only send a hash share statistically 1 out of every 10000 times. Moreover, what is normally done is that a difficulty target (number of leading zeros) is set so that the hashing device only emits a hash share once every 10 seconds or so. This means that for a machine that say hashes 10 TH/s, a target is set so that the chances that the hash matches the target is 1 in 100,000,000,000,000 (10*10 trillion). That way the device will generally emit a share every 10 sec. As long as statistically it sends about 8640 shares in the last 24 h period, it is assumed to be okay and the contract has been met. However the problem is that this is like rolling dice, and statistically no machine is going to entirely regular—there will be statistical 'runs' such that it is hard to clearly show that a machine isn't just being unlucky. Also machines regularly perform a bit under specification, so it is also hard to tell if the machine is just running poorly, or whether or not the machine is being hijacked. Therefore hash should be encrypted to ensure that those hash values cannot be used elsewhere.

An alternative to having custom firmware on the hashing devices is to have an intermediate device (e.g. fashioned in an FPGA) which is placed in front of the network switch, which can act as a proxy for the pool. The hashing units will speak to this unit as if it were the pool node. The purpose of this device is to authenticate with the pool server, negotiate a one-time pre-shared key, and encrypt all the shares that pass through it in order to guarantee them. It also may be possible to simply keep track of all the hashing units connected to it via IP address and track any irregular activity, namely disconnects from the proxy. This alone may be used to guarantee that the hashing units are contributing the guaranteed hash.

To summarize, embodiments of the present invention provide a device for guaranteeing hash production. The device encodes every PoW share with a OTP (one-time pad). This OTP is XOR'd out at the receiving end. Only PoW shares which pass this filter are counted towards the total share. This ensures that shares generated can only be accepted at the mining pool which is acting as the deliver location for the hash power.

A measuring device for hash power can be used in order to allow the hash power futures market to act very much analogous to power futures markets. This will allow for the great expansion in the liquidity and utility of this market, and will mean significant addition to the usefulness of this market for the proof of work miners on blockchain systems. By creating an effective settlement and clearing process for physically settling hash futures, the hash futures market can be made analogous to the power markets, and any hashing pool which can guarantee the hash power being sent to their pool is trustworthy can charge a settlement and clearing fee for all contracts which are settled through their platform.

CONCLUSION

It will be appreciated that the above embodiments have been described by way of example only.

More generally, according to one aspect disclosed herein there is provided a computer-implemented method of delivering hash values from a hashing device to a hashing pool, wherein the method comprises: obtaining a candidate block header for a candidate block of a blockchain; performing a plurality of hashing operations on the candidate block header to generate a plurality of candidate proof-of-work (PoW) solutions; encrypting each of the candidate PoW solutions with an encryption key; and sending the encrypted candidate PoW solutions to a hashing pool, wherein the hashing pool configured to decrypt the encrypted candidate PoW solutions.

In embodiments, the encryption key may be a one-time pad encryption key.

In embodiments, each of the candidate PoW solutions may be encrypted using XOR encryption or modular addition.

In embodiments, the method may comprise obtaining the encryption key from the hashing pool or sending the encryption key to the hashing pool.

In embodiments, the method may comprise establishing a shared secret with the hashing pool, and wherein the encryption key is encrypted with the shared secret prior to being obtained from the hashing pool and/or sent to the hashing pool.

In embodiments, the method may comprise calculating the shared secret based on a private key of the hashing device and a public key of the hashing pool, and wherein the hashing pool can calculate the shared secret based on a private key of the hashing pool and a public key of the hashing device.

In embodiments, the firmware of the hashing device may have a fingerprint, and wherein the private key of the hashing device may be based on a checksum of the fingerprint.

In embodiments, the fingerprint may be an existing public key fingerprint.

In embodiments, the method may comprise updating the encryption key.

In embodiments, the encryption key may be updated in response to one of a set of predefined events, wherein the set of predefined events comprises: a reboot of the hashing device, a predefined time period since the last update of the encryption key, and receiving a new candidate block header.

In embodiments, the method may comprise enforcing all candidate PoW solutions that are sent to hashing pool to be encrypted.

In embodiments, the method may comprise only encrypting candidate PoW solutions that satisfy a predetermined difficulty condition.

In embodiments, said sending may comprise sending the encrypted candidate PoW solutions to an intermediary device configured to forward the encrypted candidate PoW solutions to the hashing pool.

According to another aspect disclosed herein there is provided a hashing device comprising: an input interface configured to obtain a candidate block header for a candidate block of a blockchain; a hashing component configured to apply a hash function to at least the candidate block header one or more times, wherein each application of the hash function to at least the candidate block header generates a respective candidate PoW solution; an encrypting component configured to encrypt each of the candidate PoW solutions; and an output interface configured to output the candidate PoW solutions to a hashing pool.

According to another aspect disclosed herein there is provided a computer-implemented method of obtaining hash values from a hashing device, wherein the method comprises: receiving a plurality of candidate PoW solutions from a hashing device; counting the number of candidate PoW solutions received from the hashing device over a predetermined period of time; and determining whether a contract has been fulfilled based on whether the number of candidate PoW solutions meets an expected number of candidate PoW solutions.

In embodiments, the method may comprise, on condition that a predetermined difficult condition is met by one of the candidate PoW solutions, sending a blockchain block comprising that candidate PoW solution to the blockchain network.

In embodiments, the method may comprise sending candidate block header to hashing device.

In embodiments, the plurality of candidate PoW solutions received from the hashing device may be each encrypted with an encryption key, and wherein the method may comprise: decrypting each of the plurality of encrypted candidate PoW solutions, using a decryption key corresponding to the encryption key, to obtain a plurality of candidate PoW solutions.

In embodiments, the encryption key may be a one-time pad encryption key.

In embodiments, each of the candidate PoW solutions may be encrypted using XOR encryption or modular addition.

In embodiments, the method may comprise obtaining the encryption key from the hashing device or sending the encryption key to the hashing device.

In embodiments, the method may comprise establishing a shared secret with the hashing device, and wherein the encryption key is encrypted with the shared secret prior to being obtained from the hashing device or sent to the hashing device.

According to another aspect disclosed herein, there may be provided computer equipment comprising: memory comprising one or more memory units; and processing apparatus comprising one or more processing units, wherein the memory stores code arranged to run on the processing apparatus, the code being arranged so as when on the processing apparatus to perform the method of any of the described embodiments.

According to another aspect disclosed herein, there may be provided a computer program embodied on computer-readable storage and configured so as when run on computer equipment to perform the method of any of the described embodiments.

According to another aspect disclosed herein, there may be provided a method comprising the actions of the hashing device and the hashing pool.

According to another aspect disclosed herein, there may be provided a system comprising the hashing device and the hashing pool.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of delivering hash values from a hashing device to a hashing pool, wherein the method comprises:
    obtaining a candidate block header for a candidate block of a blockchain;
    performing a plurality of hashing operations on the candidate block header to generate a plurality of candidate proof-of-work (PoW) solutions;
    encrypting each of the candidate PoW solutions with an encryption key; and
    sending the encrypted candidate PoW solutions directly to the hashing pool, wherein the hashing pool is configured to decrypt the encrypted candidate PoW solutions.

2. The method of claim 1, wherein the encryption key is a one-time pad encryption key.

3. The method of claim 1, wherein each of the candidate PoW solutions is encrypted using XOR encryption or modular addition.

4. The method of claim 1, comprising obtaining the encryption key from the hashing pool or sending the encryption key to the hashing pool.

5. The method of claim 4, comprising establishing a shared secret with the hashing pool, and wherein the encryption key is encrypted with the shared secret prior to the encryption key being obtained from the hashing pool or being sent to the hashing pool.

6. The method of claim 5, comprising calculating the shared secret based on a private key of the hashing device and a public key of the hashing pool, and wherein the hashing pool can calculate the shared secret based on a private key of the hashing pool and a public key of the hashing device.

7. The method of claim 6, wherein firmware of the hashing device has a fingerprint, and wherein the private key of the hashing device is based on a checksum of the fingerprint.

8. The method of claim 7, wherein the fingerprint is an existing public key fingerprint.

9. The method of claim 1, comprising updating the encryption key.

10. The method of claim 9, wherein the encryption key is updated in response to one of a set of predefined events, wherein the set of predefined events comprises:
    a reboot of the hashing device,
    a predefined time period since a last update of the encryption key, and
    receiving a new candidate block header.

11. The method of claim 1, comprising only encrypting candidate PoW solutions that satisfy a predetermined difficulty condition.

12. A hashing device comprising:
- an input interface configured to obtain a candidate block header for a candidate block of a blockchain;
- a hashing component configured to apply a hash function to at least the candidate block header one or more times, wherein each application of the hash function to at least the candidate block header generates a respective candidate PoW solution;
- an encrypting component configured to encrypt each of the candidate PoW solutions; and
- an output interface configured to output the candidate PoW solutions directly to a hashing pool.

13. A computer-implemented method of obtaining hash values from a hashing device, wherein the method comprises:
- receiving a plurality of candidate PoW solutions directly from a hashing device;
- counting a number of the plurality of candidate POW solutions received from the hashing device over a predetermined period of time; and
- determining whether a contract has been fulfilled based on whether the number of the plurality of candidate PoW solutions meets an expected number of candidate PoW solutions.

14. The method of claim 13, comprising:
- on condition that a predetermined difficult condition is met by one of the candidate PoW solutions, sending a blockchain block comprising that candidate PoW solution to a blockchain network.

15. The method of claim 13, comprising sending a candidate block header to hashing device.

16. The method of claim 13, wherein the plurality of candidate PoW solutions received from the hashing device are each encrypted with an encryption key, and wherein the method comprises:
- decrypting each of the plurality of encrypted candidate PoW solutions, using a decryption key corresponding to the encryption key, to obtain a plurality of candidate PoW solutions.

17. The method of claim 16, wherein the encryption key is a one-time pad encryption key.

18. The method of claim 16, wherein each of the candidate PoW solutions is encrypted using XOR encryption or modular addition.

19. The method of claim 16, comprising obtaining the encryption key from the hashing device or sending the encryption key to the hashing device.

20. The method of claim 19, comprising establishing a shared secret with the hashing device, and wherein the encryption key is encrypted with the shared secret prior to being obtained from the hashing device or sent to the hashing device.

* * * * *